(12) United States Patent
Sato et al.

(10) Patent No.: US 7,268,539 B2
(45) Date of Patent: Sep. 11, 2007

(54) PULSE SIGNAL GENERATOR

(75) Inventors: Kensaku Sato, Shinagawa-ku (JP);
Masami Tanaka, Shingawa-ku (JP);
Tadashi Kubota, Shinagawa-ku (JP);
Hideki Sakamoto, Wako (JP); Makoto Kobayashi, Wako (JP); Satoshi Yamaguchi, Wako (JP); Mamoru Hasegawa, Wako (JP); Yuichi Shimasaki, Wako (JP)

(73) Assignees: Hirose Electric Co., Ltd., Tokyo (JP);
Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/541,148

(22) Filed: Sep. 28, 2006

(65) Prior Publication Data

US 2007/0075704 A1    Apr. 5, 2007

(30) Foreign Application Priority Data

Sep. 30, 2005  (JP) .............................. 2005-286894

(51) Int. Cl.
*G01B 7/30* (2006.01)
(52) U.S. Cl. ................................ 324/207.25
(58) Field of Classification Search ............ 324/207.2, 324/251, 207.25; 73/514.31, 514.39; 338/32 R, 338/32 H
See application file for complete search history.

(56) References Cited

FOREIGN PATENT DOCUMENTS

| JP | 04-218950 | 8/1992 |
|---|---|---|
| JP | 09-032620 | 2/1997 |
| JP | 11-062687 | 3/1999 |
| JP | 2002-213605 | 7/2002 |
| JP | 3617604 | 11/2004 |

*Primary Examiner*—Bot LeDynh
(74) *Attorney, Agent, or Firm*—Cohen Pontani Lieberman & Pavane LLP

(57) ABSTRACT

A pulse signal generator using a magnetic device that can cause a large Barkhausen effect, comprises means having a number of pits and projections and generates pulses according to the behavior of these, the means being capable of moving the pits and projections in a first or second direction, the pits and projections being disposed in the moving direction with some of the projections missing or some of the pits filled. The value of the ratio between the time interval of pulses generated by portions other than a projection-missing portion and the time interval of pulses generated by the projection-missing portion or the value of the ratio between the time interval of pulses generated by portions other than a pit-filled portion and the time interval of pulses generated by the pit-filled portion differs between when the pits and projections move in the first or second direction.

7 Claims, 8 Drawing Sheets

PULSE SIGNAL GENERATOR

BACKGROUND OF THE INVENTION (i) Field of the Invention

This invention relates to a pulse signal generator, for example, a pulse signal generator which generates different pulses according to the rotation direction of a disk-shaped rotator gear.

(ii) Description of the Related Art

In recent years, such a pulse signal generator using a magnetic device that can cause a large Barkhausen jump or Barkhausen effect as described in Japanese Patent No. 3,617,604 and other literatures has been developed. However, a traveling direction detector using this type of pulse signal generator, e.g. a detector for detecting the rotation direction of a rotator gear, has still not been available.

An example of the rotation direction detector is a detector which detects the positive rotation or negative rotation of a rotator gear by use of a semiconductor magnetic sensor (hall element or magnetoresistive element) having two detection sections, as disclosed in Japanese Patent Laid-Open Publication No. H9-32620. However, this device has problems that the output leading lines of the sensor are increased and that complicated rotation direction detecting means is required for control.

Further, Japanese Patent Laid-Open Publication No. H11-62687 discloses a device which uses two electromagnetic pickup sensors for a crank angle sensor and a cylinder detecting sensor in order to detect the rotation direction of an engine. However, since this device detects the rotation direction of the engine by comparing two signals from these crank angle sensor and cylinder detecting sensor with each other, the device has a problem that it can be used only for detection of the rotation direction of the engine.

In addition, Japanese Patent Laid-Open Publication No. 2002-213605 discloses a device which uses electromagnetic pickup sensors for detecting a vehicle speed and a traveling direction. This constitution requires two sensors and two rotors for detection.

Although the magnetic device that can cause a large Barkhausen jump (hereinafter may be simply referred to as "magnetic device") is already well known as described in the above Japanese Patent No. 3,617,604, it will be briefly described hereinafter just to make sure. First, the structure and behavior of a generally known wire-shaped compound magnetic device will be described as an example. A thin wire obtained by drawing a ferromagnetic material has a unique magnetic properties in addition to its alloy composition. When twist stress is imposed on this ferromagnetic wire, the peripheral portion of the wire is twisted more severely and its central portion is twisted less severely, so that its peripheral portion and central portion have different magnetic properties. When the wire is so processed as to keep this state, a ferromagnetic wire whose peripheral portion and central portion have different magnetic properties is obtained. The magnetization direction of the peripheral portion is changed by a relatively small magnetic field. Meanwhile, the magnetization direction of the central portion is changed by a larger magnetic field. That is, a compound magnetic material having two different magnetic properties, i.e. a peripheral portion having a magnetic property which is relatively easily magnetized and a central portion which is less easily magnetized, in one magnetic wire is formed. This compound magnetic wire is uniaxially anisotropic. Hereinafter, the peripheral portion will be referred to as "soft layer", the central portion will be referred to as "hard layer", and such a compound magnetic wire will be referred to as "wire-shaped compound magnetic device".

The hard layer and soft layer of this compound magnetic wire are initially not magnetized in a specific direction and are in a randomly magnetized state. When an external magnetic field which is strong enough to reverse the magnetization direction of the hard layer is applied parallel to the longitudinal direction or axial direction of this compound magnetic wire, the hard layer as well as the soft layer is magnetized in the same magnetization direction. Then, an external magnetic field capable of magnetizing only the soft layer is applied in the direction opposite to the previous direction. As a result, the compound magnetic wire is in a magnetized state in which the soft layer and the hard layer are magnetized in the opposite directions. Since the compound magnetic wire is uniaxially anisotropic, the magnetization direction of the soft layer is retained by the magnetization of the hard layer and the magnetized state is stable, even if the external magnetic field is removed in the above state. The above external magnetic field is referred to as "set magnetic field". Then, an external magnetic field whose direction is opposite to the set magnetic field is applied to enhance the magnetic field. When the intensity of the external magnetic field exceeds certain critical intensity, the magnetization direction of the soft layer is revered immediately. This magnetic field is referred to as "critical magnetic field". The above reverse phenomenon occurs such that the magnetic domain wall of the soft layer moves like an avalanche and a reaction occurs. As a result, the magnetization directions of the soft layer and hard layer becomes the same and the original state is reinstated. The applied external magnetic field is larger than the critical magnetic field. This magnetic field is referred to as "reset magnetic field ($H_R$)". The above phenomenon that the domain wall moves like an avalanche is referred to as "large Barkhausen jump". The speed of the magnetic domain wall (change in magnetic flux density) is dependent only on this large Barkhausen jump and is not relevant to an external magnetic field.

Although the "magnetic device that can cause a large Barkhausen jump" has so far been described by use of the wire-shaped magnetic device as an example, it is not limited to such a wire-shaped compound magnetic device, and various other magnetic devices which show a similar behavior can also be used. Further, although the above compound magnetic device has the hard layer and the soft layer, the magnetic device that can cause a large Barkhausen jump may also be a magnetic device which does not have a compound layer of the hard layer and the soft layer. For example, it is possible to form a thin-film magnetic material by use of a thin-film formation technique as disclosed in Japanese Patent Laid-Open Publication No. H4-218950 and use the material as a thin-film magnetic device. Further, the magnetic device may be in the form of a thick film or a plate. Accordingly, the terms "magnetic device that can cause a large Barkhausen jump" as used herein include all of various magnetic devices that show the foregoing behavior.

Patent Literature 1
   Japanese Patent No. 3,617,604

Patent Literature 2
   Japanese Patent Laid-Open Publication No. H9-32620

Patent Literature 3
   Japanese Patent Laid-Open Publication No. H11-62687

Patent Literature 4
   Japanese Patent Laid-Open Publication No. 2002-213605

An object of the present invention is to provide a novel pulse signal generator which can be used to detect the traveling direction of an object to be detected by use of a magnetic device that can cause a large Barkhausen jump.

SUMMARY OF THE INVENTION

The present invention provides a pulse signal generator which comprises means having a number of pits and projections and generates pulses according to the behavior of the projections and pits of the means, the means being capable of moving the pits and the projections in a first direction sequentially in given order or moving the pits and the projections in a second direction sequentially in reverse order of the order in the first direction, the pits and the projections being disposed in the moving direction alternately at equal spaces with some of the projections missing or some of the pits filled, wherein the value of the ratio between the time interval of pulses generated by portions other than a projection-missing portion and the time interval of pulses generated by the projection-missing portion or the value of the ratio between the time interval of pulses generated by portions other than a pit-filled portion and the time interval of pulses generated by the pit-filled portion differs between when the pits and the projections move in the first direction and when the pits and the projections move in the second direction.

The above generator may be such that the ratio between the time interval of pulses generated by portions other than the projection-missing portion and the time interval of pulses generated by the projection-missing portion is n+1 (n is the number of consecutive missing projections) when the pits and the projections move in the first direction and n/2+1 when the pits and the projections move in the second direction.

Further, the above generator may be such that the ratio between the time interval of pulses generated by portions other than the pit-filled portion and the time interval of pulses generated by the pit-filled portion is n/2+1 (n is the number of consecutive filled pits) when the pits and the projections move in the first direction and n+1 when the pits and the projections move in the second direction.

The above generator may be such that the means is a disk-shaped metallic rotator capable of rotating in the first rotation direction or the second rotation direction around a rotational axis, the pits and projections of the means are teeth which are disposed alternately on the rim of the rotator at equal spaces in the circumferential direction, and some of the projections are missing or some of the pits are filled.

The above generator may be such that the pulse signal generating means comprises:

a magnetic device which can cause a large Barkhausen jump, detection means for detecting a change in a magnetic field in the magnetic device, and magnetic field generating means for magnetizing the magnetic device in a given direction, the magnetic field generating means is formed such that a straight line that connects the north pole and the south pole which generate a magnetic field for magnetizing the magnetic device in a given direction extends in a direction extending from one end of the magnetic device, and the generator generates pulses by changing the magnetized state of the magnetic device by the magnetic field generating means according to the behavior of the pits and the projections and detecting the change in the magnetized state which has occurred in the magnetic device due to the change in the magnetic field by the detection means.

The above generator may be such that the magnetic field generating means are magnets disposed parallel to the magnetic device so that they face both sides of the magnetic device and disposed in opposite directions so that the polarities of the magnets to the projections and the pits become opposite.

Further, the above generator may further comprise: determination means wherein the determination means receives pulses from the pulse signal generating means and determines from the value of the ratio whether the pits and the projections are moving in the first direction or the second direction.

DETAILED DESCRIPTION OF THE PREFERRED EMBODIMENTS

Hereinafter, a suitable embodiment of the present invention will be described with reference to the attached drawings.

Figure 1:
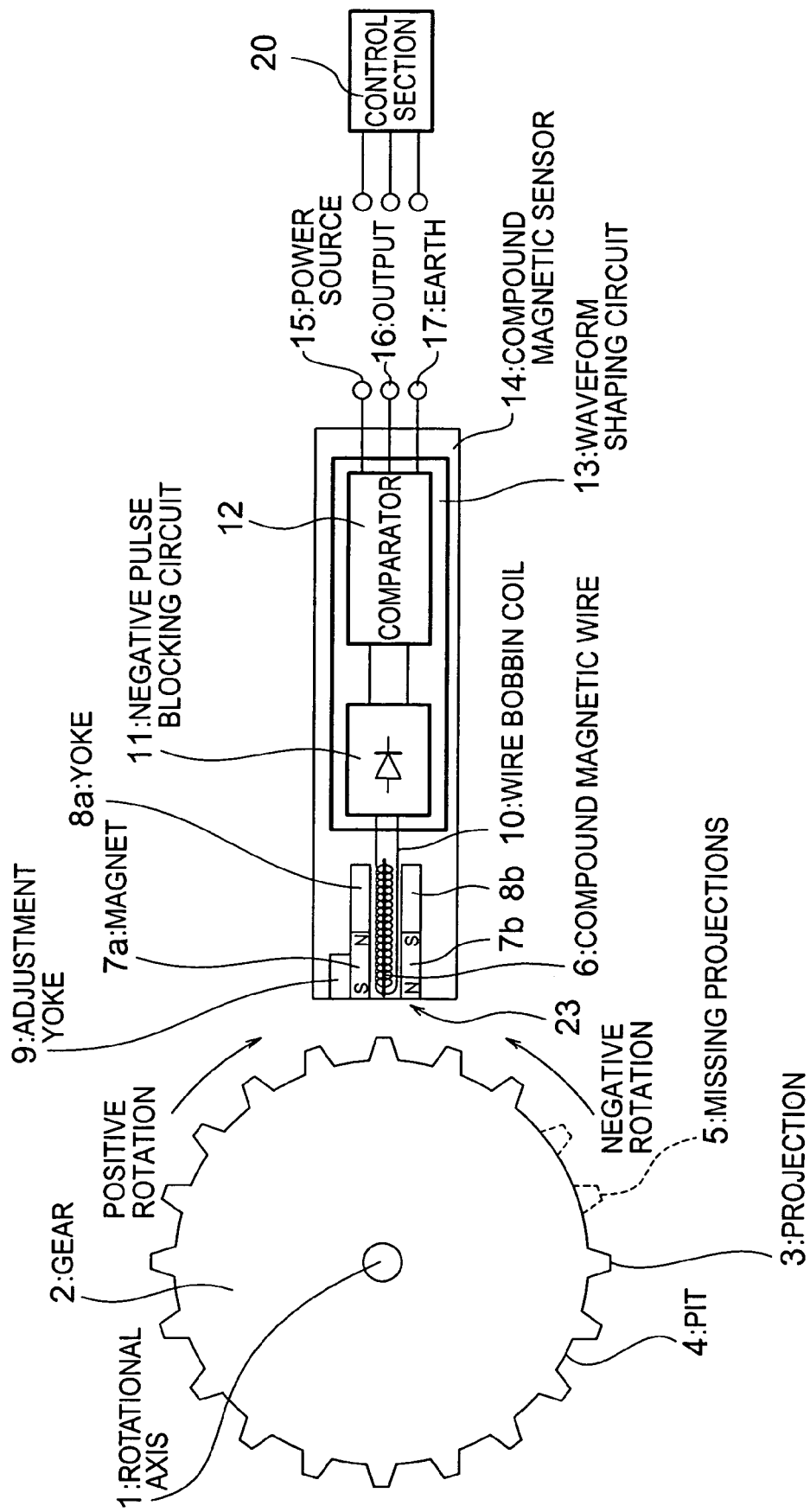
FIG. 1 is a schematic diagram showing an example of application of a pulse signal generator according to one suitable embodiment of the present invention to a rotation direction detector.

FIG. 1 is a schematic diagram showing an example of application of a pulse signal generator according to one suitable embodiment of the present invention to a rotation direction detector. A compound magnetic sensor 14 which is a pulse signal generator according to one embodiment of the present invention generates predetermined pulse signals according to rotations of a gear-shaped circular metallic rotator 2 which is disposed adjacent to the sensor 14. These pulse signals can be used for, for example, detecting the rotation direction.

The rotator 2 can make positive rotations or negative rotations around a rotational axis 1. The rotator 2 has a plurality of teeth formed on its rim. These teeth form projections 3 and pits 4 of nearly the same shape which are disposed alternately at equal spaces in the circumferential direction. However, it is to be noted that the rotator 2 is not a normal rotator having the projections and pits disposed alternately at equal spaces in the circumferential direction with no projections or pits missing but is an abnormal rotator having some of the projections 3 removed or some of the pits 4 filled to be used for detection of the positive rotation or negative rotation. For example, FIG. 1 shows an abnormal rotator with some of the projections 3 removed. The present device generates pulses according to the behavior of these projections 3 and pits 4 and can also detect the positive or negative rotation of the rotator 2 based on the value of the ratio determined from these pulses.

The compound magnetic sensor 14 primarily comprises a pulse signal generating section 23 and a waveform shaping circuit 13.

The pulse signal generating section 23 is a section that generates pulses by use of a large Barkhausen jump, and this constitution is specifically described in Japanese Patent No. 3,617,604 and other literatures. The pulse signal generating section 23 at least comprises a compound magnetic wire 6 which is a magnetic device which can cause a large Barkhausen jump, a wire bobbin coil 10 which is detection means for detecting a change in a magnetic field in the compound magnetic wire 6 by being wrapped around the compound magnetic wire 6, and magnets 7 which are magnetic field generating means for magnetizing the compound magnetic wire 6 in a given direction. The magnets 7 may be magnets disposed parallel to the compound magnetic wire 6 so that they face both sides of the compound magnetic wire 6 and disposed in opposite directions so that the polarities of the magnets to the projections 3 and the pits 4 become opposite (a magnet 7a is disposed such that its south pole is situated close to the projections 3 and the pits 4 and the other magnet 7b is disposed parallel to the magnet 7a such that its north pole is situated close to the projections 3 and the pits 4). Each of the magnets 7a and 7b is disposed such that a straight line that connects the north pole and the south pole which generate a magnetic field for magnetizing the compound magnetic wire 6 in a given direction extends in the direction extending from one end of the compound magnetic wire 6.

Under such a constitution, the magnetized state of the compound magnetic wire 6 by the magnets 7 is changed according to sequential approach of the projections 3 and the pits 4, a large Barkhausen jump occurs in the compound magnetic wire 6 according to the change, the compound magnetic wire 6 is reset to a state before the occurrence of the large Barkhausen jump, and these changes are detected by the wire bobbin coil 10, whereby positive or negative pulses can be generated. The generation of the positive or negative pulse in the wire bobbin coil 10 is determined by the magnetic intensity relationship between the magnets 7a and 7b. For example, in the case of positive rotations, when the projection 3 passes by the magnet 7a, a positive pulse is generated because the magnetic force of the magnet 7a becomes relatively weaker than the magnetic force of the magnet 7b, while when the pit 4 passes by the magnet 7a, a negative pulse is generated because the magnetic force of the magnet 7b becomes relatively stronger than the magnetic force of the magnet 7a. When it is assumed that the rotator 2 rotates at a constant speed, the positive pulse is generated at or near the middle position of each projection 3 in the circumferential direction of the rotator, and the negative pulse is generated at or near the middle position of each pit 4 in the circumferential direction of the rotator. A pulse wave generated by the wire bobbin coil 10 is output to 16 via a negative pulse blocking circuit 11 and a comparator 12. To stabilize the magnetic forces of the magnets 7, a yoke 8 may be additionally provided. Further, to adjust the effect of the yoke 8, an adjustment yoke 9 may be provided in the vicinity of the magnets 7a and 7b. In the illustrated embodiment, the adjustment yoke 9 is provided only on the magnet 7a side so as to make the magnetic force of the magnet 7a weaker than the magnetic force of the magnet 7b. In this case, pulses are generated according to approach (or behavior) of the projections 3 and the pits 4 not to the magnet 7b but to the magnet 7a.

The waveform shaping circuit 13 comprises the negative pulse blocking circuit 11 and the comparator 12. The negative pulse blocking circuit 11 extracts either only positive pulses or only negative pulses from a number of pulses generated in the pulse signal generating section 23 and filters out the other pulses. The comparator 12 extracts pulses whose size is equal to or larger than a given size from the pulses extracted by the negative pulse blocking circuit 11. The pulses extracted by the comparator 12 are then taken out of the compound magnetic sensor 14 from the output 16 and processed in a control section 20 which serves as rotation direction detecting means. By processing the pulses in this control section 20, the rotation direction of the rotator 2 is detected. Electric power required for the compound magnetic sensor 14 is obtained from a power source 15, and the compound magnetic sensor 14 is grounded through an earth 17.

Figure 2:
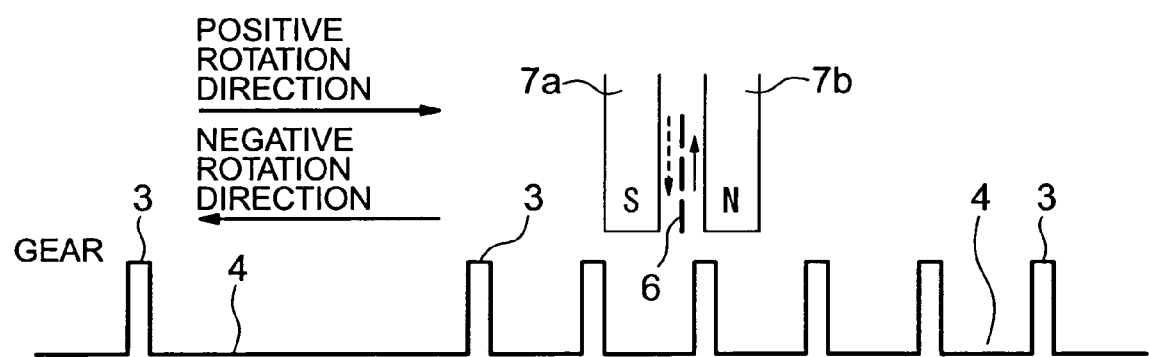
FIG. 2 is a diagram illustrating the positional relationship between projections and pits and the front end of a compound magnetic sensor.
Figure 3:
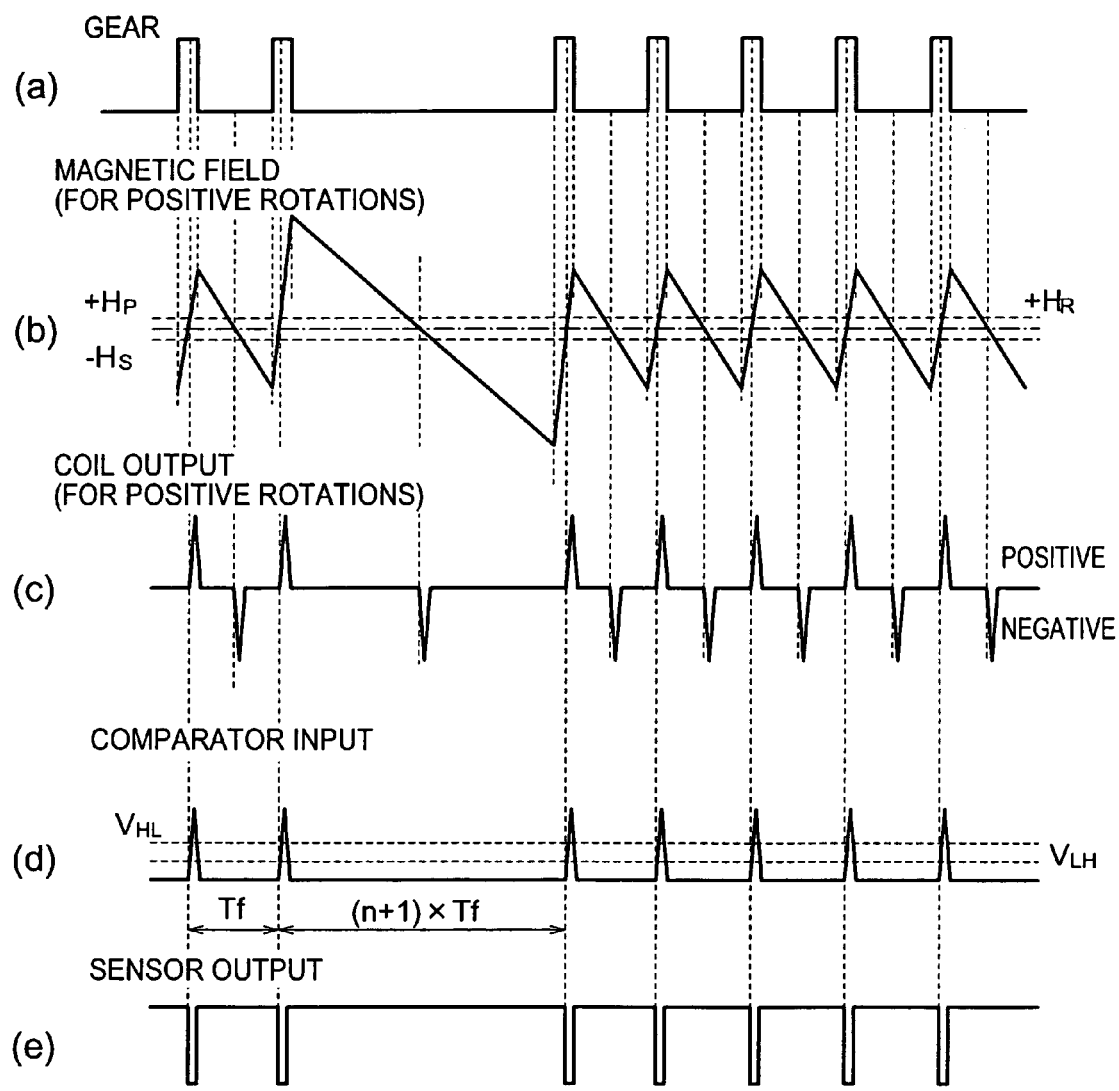
FIG. 3 is a diagram illustrating the state of pulses generated when a rotator makes positive rotations.
Figure 4:
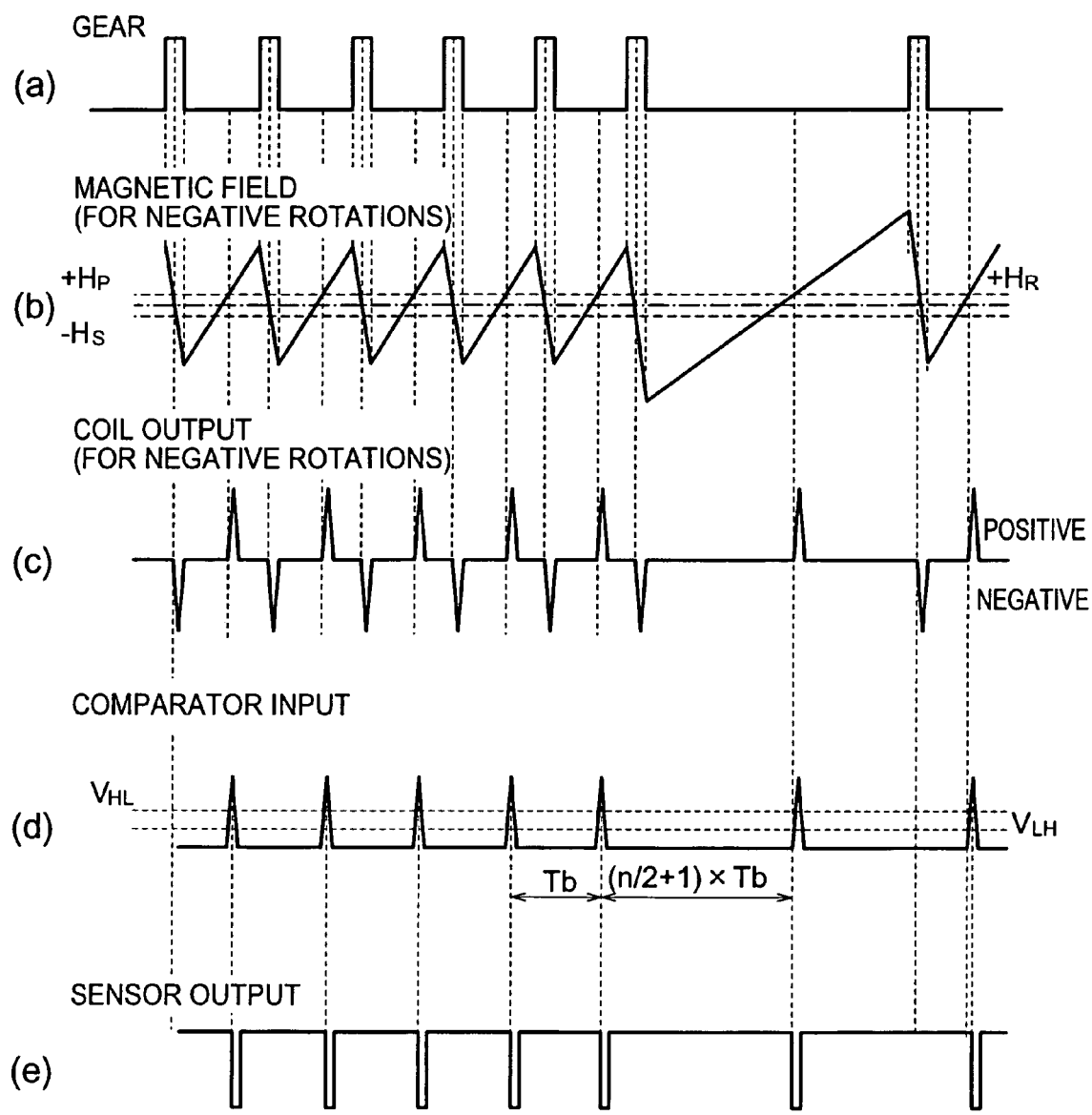
FIG. 4 is a diagram illustrating the state of pulses generated when the rotator makes negative rotations.

Next, the operation principle of the rotation direction detector to which the pulse signal generator according to the present invention is applied will be described specifically with reference to FIGS. 2 to 4. FIG. 2 illustrates the positional relationship between the projections 3 and pits 4 and the front end of the compound magnetic sensor 14. FIGS. 3 and 4 illustrate changes in a magnetic field and the waveform of electrical pulse in each section of the compound magnetic sensor 14 when the rotator 2 rotates. In particular, FIG. 3 illustrates the state of pulses generated when the rotator 2 makes positive rotations, and FIG. 4 illustrates the state of pulses generated when the rotator 2 makes negative rotations. It should be noted that the rotator 2 is an abnormal rotator having some (in this case, two) of the projections 3 removed, as described above.

As is obvious from FIG. 2, when the rotator 2 makes positive rotations, the projections 3 and the pits 4 that are objects to be detected move in a first direction sequentially in given order, while when the rotator 2 makes negative rotations, the projections 3 and the pits 4 move in a second direction sequentially in reverse order of the order in the first direction and can pass by the front end of the compound magnetic sensor 14.

As shown in FIG. 3(a), when the rotator 2 makes positive rotations, such a magnetic field as shown in FIG. 3(b) can be generated, for example, around the compound magnetic wire 6, particularly when the projection 3 passes by the compound magnetic sensor 14. However, as is obvious, when the polarities of the magnets 7a and 7b of the compound magnetic sensor 14 are changed, pulses are generated by the pits 4 of the rotator 2. "+Hp" and "−Hs" in FIG. 3 indicate the sizes of "pulse generating magnetic field" and "set magnetic field", respectively. When the magnetic field generated around the compound magnetic wire 6 when the projection 3 passes exceeds +Hp, such a positive pulse as shown in FIG. 3(c) is generated at both ends of the wire bobbin coil 10 by a large Barkhausen jump which has occurred in the compound magnetic wire 6. Meanwhile, right before the magnetic field becomes lower than −Hs, such a negative pulse as shown in FIG. 3(c) is generated. If the rotator 2 is rotating at a constant speed, these pulses are generated when the projections 3 of the rotator 2 pass by the compound magnetic sensor 14.

These positive pulses and negative pulses are then input into the negative pulse blocking circuit 11 and the negative pulses are filtered out. Thereby, only the positive pulses appear at the output of the negative pulse blocking circuit 11 as shown in FIG. 3(*d*). Then, these positive pulses are input into the comparator 12 to shape the waveforms thereof. As a result, only pulses of given size, for example, only pulses larger than $V_{HL}$, are output at the output of the comparator 12 as shown in FIG. 3(*e*). These pulses can be taken out of the compound magnetic sensor 14 via the output 16.

As is clear from FIG. 3(*e*), if the rotator 2 is rotating at a constant speed and the time interval of pulses generated by portions other than a projection-missing portion 5 where some of the projections 3 have been removed is Tf, the time interval of pulses generated by the projection-missing portion 5 is represented by (n+1)×Tf (n is the number of consecutive missing projections). That is, the ratio between the time interval of pulses of the projection-missing portion 5 and the time interval of pulses of portions other than the projection-missing portion 5 is n+1. In this case, since two consecutive projections 3 are missing, the above ratio, i.e. the previous Tf/the current Tf is n+1=2+1=3.

Meanwhile, as shown in FIG. 4(*a*), when the rotator 2 makes negative rotations, such a magnetic field as shown in FIG. 4(*b*) can be generated, for example, around the compound magnetic wire 6, particularly when the pit 4 passes by the compound magnetic sensor 14. However, as is obvious, when the polarities of the magnets 7*a* and 7*b* of the compound magnetic sensor 14 are changed, pulses are generated by the projections 3 of the rotator 2. When the magnetic field generated around the compound magnetic wire 6 when the pit 4 passes exceeds +Hp, such a positive pulse as shown in FIG. 4(*c*) is generated at both ends of the wire bobbin coil 10. Meanwhile, right before the magnetic field becomes lower than −Hs, such a negative pulse as shown in FIG. 4(*c*) is generated. If the rotator 2 is rotating at a constant speed, the pulses are generated when the pits 4 of the rotator 2 pass by the compound magnetic sensor 14.

These positive pulses and negative pulses are then input into the negative pulse blocking circuit 11 and the comparator 12, as in the case of the positive rotation of FIG. 3. As a result, such pulses as shown in FIG. 4(*e*) are output at the output of the comparator 12. These pulses can be taken out of the compound magnetic sensor 14 via the output 16.

As is clear from FIG. 4(*e*), if the rotator 2 is rotating at a constant speed and the time interval of pulses generated by portions other than the projection-missing portion 5 where some of the projections 3 have been removed is Tb, the time interval of pulses generated by the projection-missing portion 5 is represented by (n/2+1)×Tb. That is, the ratio between the time interval of pulses of the projection-missing portion 5 and the time interval of pulses of portions other than the projection-missing portion 5 is n/2+1. In this case, since two consecutive projections 3 are missing, the above ratio, i.e. the previous Tb/the current Tb is n/2+1=2/2+1=2. If the rotation speed of the rotator 2 at the time of positive rotation and the rotation speed of the rotator 2 at the time of negative rotation are the same, the value of Tb and the value of the above Tf are nearly the same value. However, whether these values are the same or not does not affect detection of positive rotation or negative rotation at all.

As is obvious from the above description, the ratio at the time of positive rotation which is shown in FIG. 3 is n+1, while the ratio at the time of negative rotation which is shown in FIG. 4 is n/2+1. Accordingly, it can be determined from the values of these ratios whether the rotation direction of the rotator 2 is a positive rotation or a negative rotation.

For example, if n is 2, the rotation direction is determined to be a positive rotation if the value of the ratio is 3 and a negative rotation if the value of the ratio is 2. Such a determination of the positive rotation or negative rotation based on the value of the ratio is made possible for the first time by use of the present device using a magnetic device that can cause a large Barkhausen jump.

Figure 5:
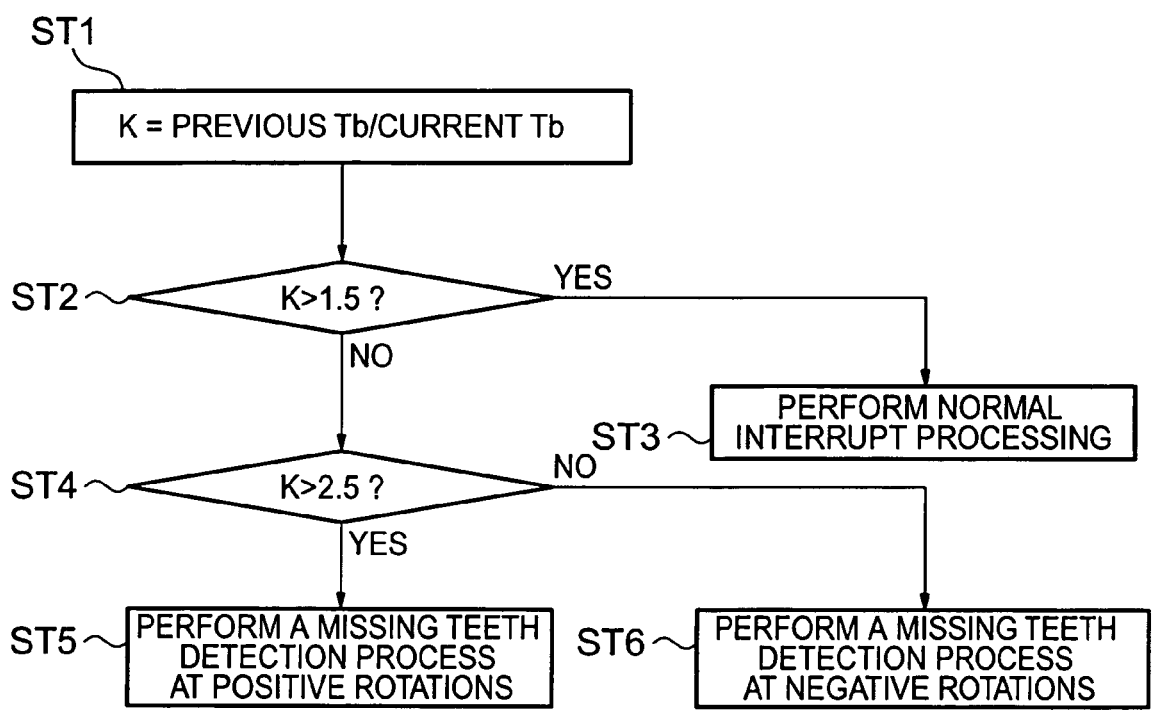
FIG. 5 is a flowchart illustrating an example of the operations of the rotation direction detector based on this result.

FIG. 5 is a flowchart illustrating an example of the operations of the rotation direction detector based on this result. This device starts with determination of the size of the above ratio (STEP(ST) 1). If the size is larger than 1.5 (ST2), the device performs normal interrupt processing irrelevant to detection of rotation direction (ST3). If the size is larger than 2.5 (ST4), the device determines that the rotation direction is a positive rotation and performs a missing teeth detection process at positive rotations (STEP 5). If the size is larger than 1.5 but not larger than 2.5, the device determines that the rotation direction is a negative rotation and performs a missing teeth detection process at negative rotations (STEP 6). The values such as 1.5 and 2 can be set appropriately in consideration of the degrees of bending and dispersion of teeth.

Next, a variation of the pulse signal generator according to the present invention will be described with reference to FIGS. 6 to 8. These FIGS. 6, 7 and 8 correspond to FIGS. 1, 3 and 4, respectively.

Figure 6:
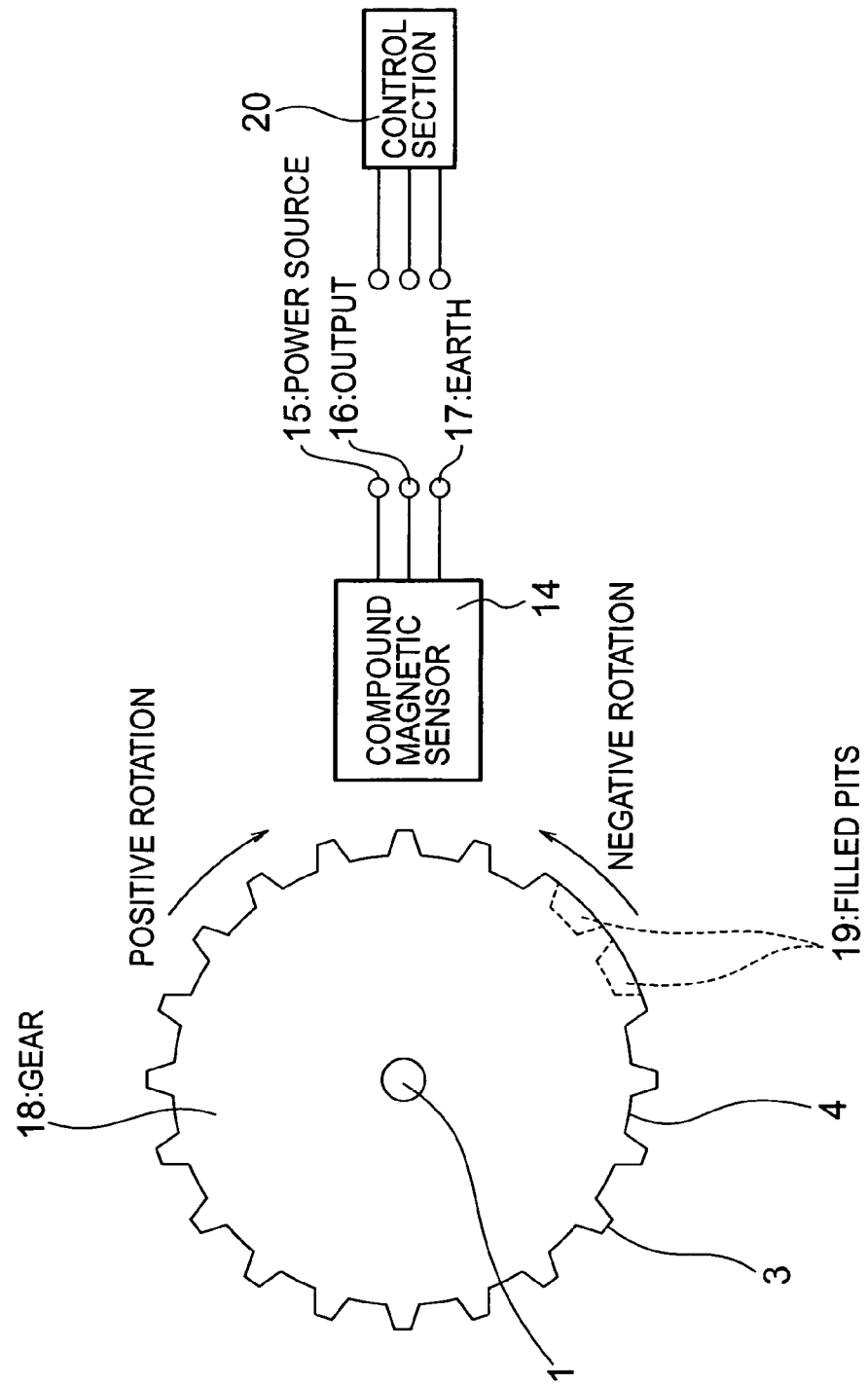
FIG. 6 is a diagram illustrating a variation of the present invention.

FIG. 6 is a schematic diagram showing an example of application of a pulse signal generator according to a variation of the present invention to a rotation direction detector. It is to be noted that a rotator 18 which is used in this variation is an abnormal rotator having some (in this case, two) of the pits 4 filled. The constitution other than the rotator 18 is completely the same as that of the device in FIG. 1. However, the constitution of the compound magnetic sensor 14 is simplified in FIG. 6 for simplification of the drawing.

The operation principle of the rotation direction detector to which the pulse signal generator according to a variation of the present invention is applied will be described in detail with reference to FIGS. 7 and 8. These FIGS. 7 and 8 illustrate changes in a magnetic field and the waveform of electrical pulse in each section of the compound magnetic sensor 14 when the rotator 18 rotates. In particular, FIG. 7 illustrates the state of pulses generated when the rotator 18 makes positive rotations, and FIG. 8 illustrates the state of pulses generated when the rotator 18 makes negative rotations.

Figure 7:
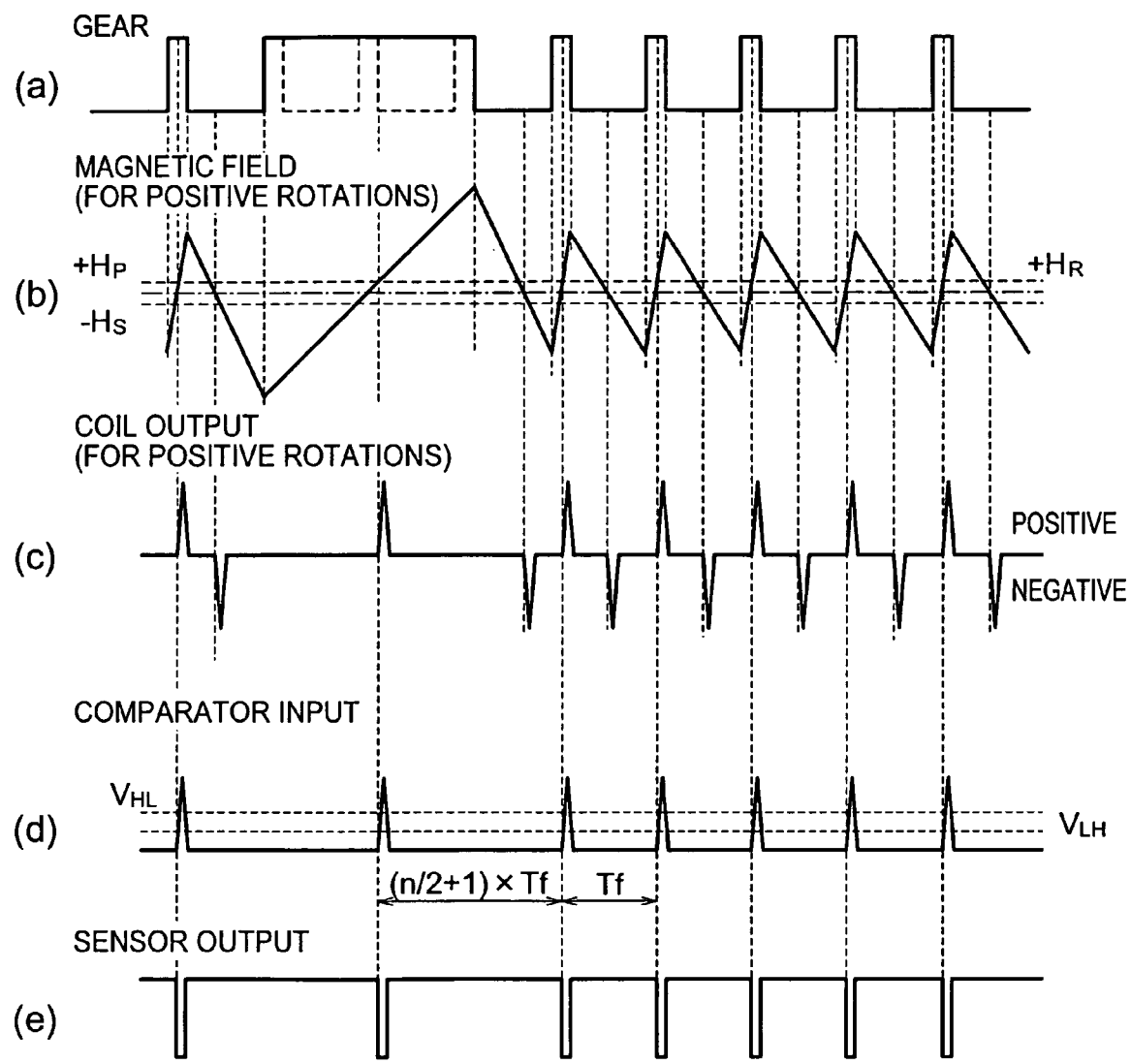
FIG. 7 is a diagram illustrating the state of pulses generated when a rotator makes positive rotations in the variation.

As shown in FIG. 7(*a*), when the rotator 18 makes positive rotations, such a magnetic field as shown in FIG. 7(*b*) can be generated, for example, around the compound magnetic wire 6, when the projection 3 passes by the compound magnetic sensor 14. However, as is obvious, when the polarities of the magnets 7*a* and 7*b* of the compound magnetic sensor 14 are changed, pulses are generated by the pits 4 of the rotator 18. When the magnetic field generated around the compound magnetic wire 6 when the projection 3 passes exceeds +Hp, such a positive pulse as shown in FIG. 7(*c*) is generated. Meanwhile, right before the magnetic field becomes lower than −Hs, such a negative pulse as shown in FIG. 7(*c*) is generated. If the rotator 18 is rotating at a constant speed, these pulses are generated when the projections 3 of the rotator 18 pass by the compound magnetic sensor 14.

These positive pulses and negative pulses are then input into the negative pulse blocking circuit 11 and the negative pulses are filtered out. Thereby, only the positive pulses appear at the output of the negative pulse blocking circuit 11 as shown in FIG. 7(d). Then, these positive pulses are input into the comparator 12 to shape the waveforms thereof. As a result, only pulses of given size, for example, only pulses larger than $V_{HL}$, are output at the output of the comparator 12 as shown in FIG. 7(e). These pulses can be taken out of the compound magnetic sensor 14 via the output 16.

As is clear from FIG. 7(e), if the rotator 18 is making positive rotations at a constant speed and the time interval of pulses generated by portions other than a pit-filled portion 19 where some of the pits 4 have been filled is Tf, the time interval of pulses generated by the pit-filled portion 19 is represented by (n/2+1)×Tf (n is the number of consecutive filled pits). That is, the ratio between the time interval of pulses of the pit-filled portion 19 and the time interval of pulses of portions other than the pit-filled portion 19 is n/2 +1. In this case, since two consecutive pits 4 are filled, the above ratio, i.e. the previous Tf/the current Tf is n/2+1=2/2+1=1+1=2.

Meanwhile, as shown in FIG. 8(a), when the rotator 18 makes negative rotations, such a magnetic field as shown in FIG. 8(b) can be generated, for example, around the compound magnetic wire 6, particularly when the pit 4 passes by the compound magnetic sensor 14. However, as is obvious, when the polarities of the magnets 7a and 7b of the compound magnetic sensor 14 are changed, pulses are generated by the projections 3 of the rotator 18. When the magnetic field generated around the compound magnetic wire 6 when the pit 4 passes exceeds +Hp, such a positive pulse as shown in FIG. 8(c) is generated at both ends of the wire bobbin coil 10. Meanwhile, right before the magnetic field becomes lower than −Hs, such a negative pulse as shown in FIG. 8(c) is generated. If the rotator 18 is rotating at a constant speed, the pulses are generated when the pits 4 of the rotator 18 pass by the compound magnetic sensor 14.

These positive pulses and negative pulses are then input into the negative pulse blocking circuit 11 and the comparator 12, as in the case of the positive rotation of FIG. 7. As a result, such pulses as shown in FIG. 8(e) are output at the output of the comparator 12. These pulses can be taken out of the compound magnetic sensor 14 via the output 16.

As is clear from FIG. 8(e), if the rotator 18 is making negative rotations at a constant speed and the time interval of pulses generated by portions other than the pit-filled portion 19 where some of the pits 4 have been filled is Tb, the time interval of pulses generated by the pit-filled portion 19 is represented by (n+1)×Tb. That is, the ratio between the time interval of pulses of the pit-filled portion 19 and the time interval of pulses of portions other than the pit-filled portion 19 is n+1. In this case, since two consecutive pits 4 are filled, the above ratio, i.e. the previous Tb/the current Tb is n+1=2+1=3. If the rotation speed of the rotator 18 at the time of positive rotation and the rotation speed of the rotator 18 at the time of negative rotation are the same, the value of Tb and the value of the above Tf are nearly the same value.

Figure 8:
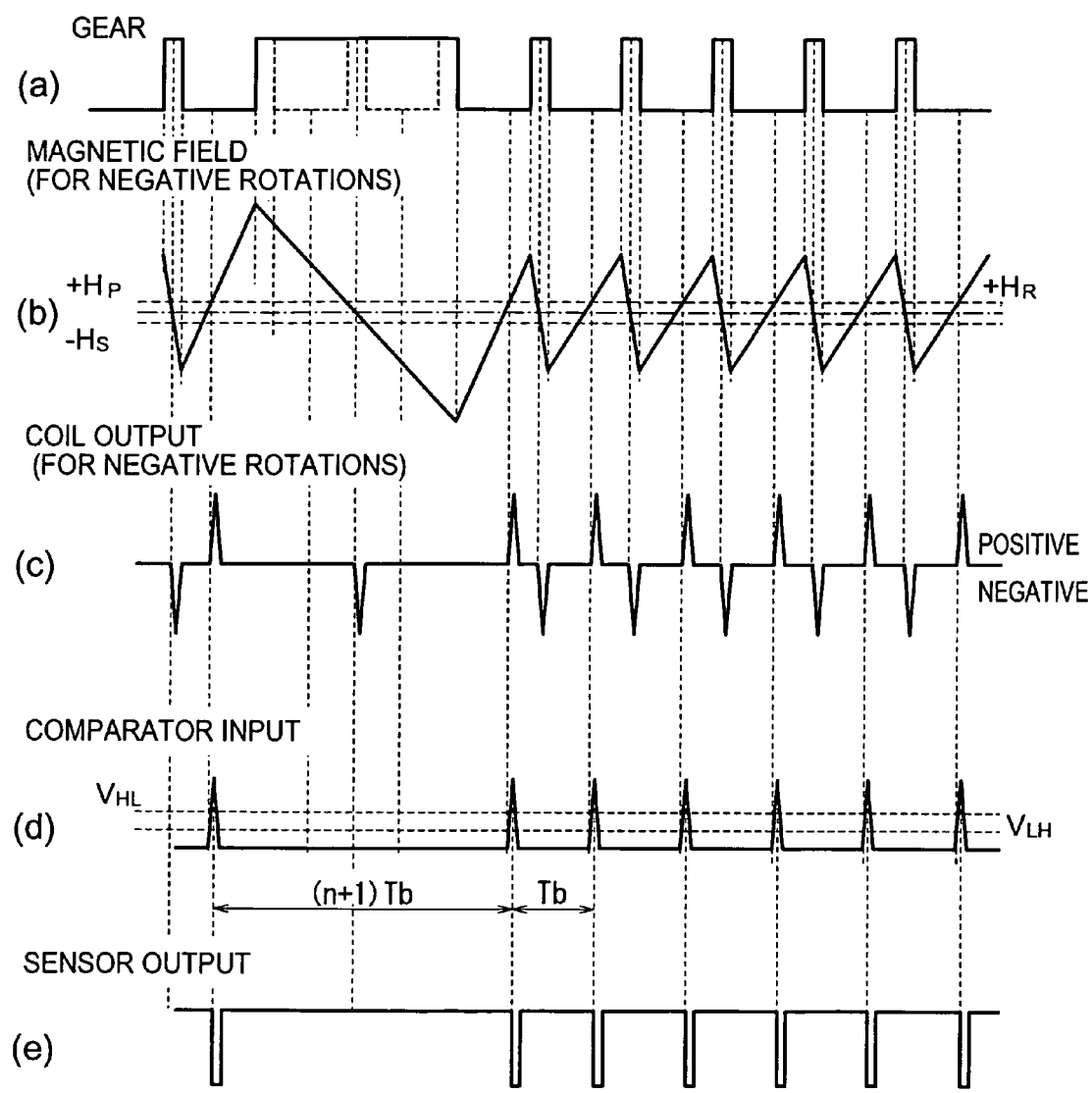
FIG. 8 is a diagram illustrating the state of pulses generated when the rotator makes negative rotations in the variation.

As is obvious from the above description, the ratio at the time of positive rotation which is shown in FIG. 7 is n/2 +1, while the ratio at the time of negative rotation which is shown in FIG. 8 is n+1. Accordingly, it can be determined from the values of these ratios whether the rotation direction of the rotator 18 is a positive rotation or a negative rotation. For example, if n is 2, the rotation direction is determined to be a positive rotation if the value of the ratio is 2 and a negative rotation if the value of the ratio is 3. These results are opposite to those of the above embodiment shown in FIGS. 1, 3 and 4.

As described above, by use of the device of the present invention, time between pulses generated during rotation of rotator is measured, and the rotation direction of the rotator can be determined from the value of the ratio of the pulses.

The present embodiment has been described by use of a gear-shaped rotator as an example. The present invention is not limited thereto. For example, the present invention can also be applied to a rotation belt that is supported rotatably by axes at two points and has pits and projections. Further, an object to be detected that is used in the present invention may be any means capable of moving a number of pits and projections in a first direction sequentially in given order or moving these pits and projections in a second direction sequentially in reverse order of the order in the first direction wherein the pits and the projections are disposed in the moving direction alternately at equal spaces with some of the projections missing or some of the pits filled.

According to the present invention as described above, for example, various sensors used in conventional engine controllers, wheel speed controllers, vehicle brake controllers and the like can be replaced, and a rotation direction detecting function can be imparted. Further, in devices having the rotation direction detecting function, the cost of rotator can be reduced, and a sensor for detecting a rotation direction can be omitted.

What is claimed is:

1. A pulse signal generator which comprises means having a number of pits and projections and generates pulses according to the behavior of the projections and pits of the means, the means being capable of moving the pits and the projections in a first direction sequentially in given order or moving the pits and the projections in a second direction sequentially in reverse order of the order in the first direction, the pits and the projections being disposed in the moving direction alternately at equal spaces with some of the projections missing or some of the pits filled, wherein the value of the ratio between the time interval of pulses generated by portions other than a projection-missing portion and the time interval of pulses generated by the projection-missing portion or the value of the ratio between the time interval of pulses generated by portions other than a pit-filled portion and the time interval of pulses generated by the pit-filled portion differs between when the pits and the projections move in the first direction and when the pits and the projections move in the second direction.

2. The generator of claim 1, wherein the ratio between the time interval of pulses generated by portions other than the projection-missing portion and the time interval of pulses generated by the projection-missing portion is n+1 (n is the number of consecutive missing projections) when the pits and the projections move in the first direction and n/2+1 when the pits and the projections move in the second direction.

3. The generator of claim 1, wherein the ratio between the time interval of pulses generated by portions other than the pit-filled portion and the time interval of pulses generated by the pit-filled portion is n/2+1 (n is the number of consecutive filled pits) when the pits and the projections move in the first direction and n+1 when the pits and the projections move in the second direction.

4. The generator of claim 1, wherein the means is a disk-shaped metallic rotator capable of rotating in the first rotation direction or the second rotation direction around a rotational axis, the pits and projections of the means are teeth which are disposed alternately on the rim of the rotator at equal spaces in the circumferential direction, and some of the projections are missing or some of the pits are filled.

5. The generator of claim 1, wherein the pulse signal generating means comprises:
- a magnetic device which can cause a large Barkhausen jump,
- detection means for detecting a change in a magnetic field in the magnetic device, and
- magnetic field generating means for magnetizing the magnetic device in a given direction, the magnetic field generating means is formed such that a straight line that connects the north pole and the south pole which generate a magnetic field for magnetizing the magnetic device in a given direction extends in a direction extending from one end of the magnetic device, and
- the generator generates pulses by changing the magnetized state of the magnetic device by the magnetic field generating means according to the behavior of the pits and the projections and detecting the change in the magnetized state which has occurred in the magnetic device due to the change in the magnetic field by the detection means.

6. The generator of claim 5, wherein the magnetic field generating means are magnets disposed parallel to the magnetic device so that they face both sides of the magnetic device and disposed in opposite directions so that the polarities of the magnets to the projections and the pits become opposite.

7. The generator of claim 1, further comprising:
- determination means wherein
- the determination means receives pulses from the pulse signal generating means and determines from the value of the ratio whether the pits and the projections are moving in the first direction or the second direction.

* * * * *